(12) United States Patent
Olds (10) Patent No.: US 8,112,774 B2
(45) Date of Patent: Feb. 7, 2012

(54) ON DEMAND DYNAMIC ADVERTISEMENT INSERTION IN AN INTERNET PROTOCOL STREAM

(75) Inventor: David Charles Olds, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 11/523,680

(22) Filed: Sep. 19, 2006

(65) Prior Publication Data

US 2008/0127245 A1    May 29, 2008

(51) Int. Cl.
*H04N 7/10* (2006.01)
*H04N 7/025* (2006.01)
*H04H 60/33* (2008.01)
*H04H 60/32* (2008.01)
*H04N 7/173* (2011.01)

(52) U.S. Cl. .................. 725/36; 725/9; 725/16; 725/110

(58) Field of Classification Search ...................... 725/36
See application file for complete search history.

(56) References Cited

U.S. PATENT DOCUMENTS

| | | | |
|---|---|---|---|
| 6,721,955 B2* | 4/2004 | Khoo et al. ..................... 725/46 |
| 7,363,643 B2* | 4/2008 | Drake et al. .................... 725/34 |
| 2003/0051249 A1* | 3/2003 | Hoang ............................ 725/95 |
| 2005/0015796 A1* | 1/2005 | Bruckner et al. ............... 725/32 |
| 2007/0074258 A1* | 3/2007 | Wood et al. ................... 725/105 |
| 2007/0143787 A1* | 6/2007 | Cankaya ......................... 725/34 |
| 2008/0016540 A1* | 1/2008 | Savoor et al. ................. 725/112 |
| 2008/0027801 A1* | 1/2008 | Walter et al. ................... 705/14 |

* cited by examiner

*Primary Examiner* — Kristine Kincaid
*Assistant Examiner* — Chris Parry
(74) *Attorney, Agent, or Firm* — Yee & Associates, P.C.; John R. Pivnichny (57) ABSTRACT

A computer implemented method, computer program product, and data processing system for managing advertisements in an Internet Protocol (IP) streaming environment by defining a viewership threshold, monitoring the Internet Protocol streaming environment, and responsive to reaching the viewership threshold, programming alternate advertisements.

18 Claims, 7 Drawing Sheets

| | 702 | 704 | 706 | 708 | 710 | 712 | 714 | 716 | |
|---|---|---|---|---|---|---|---|---|---|
| | AD NAME | PRODUCT | TYPE | RATING | UTILIZATION THRESHOLD | LAST SCHEDULED | LAST RUN | NUMBER RUN TO DATE | |
| 718 | AD1 | BEVERAGE | MUSIC | G | 10% | TIMESLOT 2 9-15-07 | TIMESLOT 2 9-17-07 | 1324 | ... |
| 720 | AD2 | INSURANCE | TALK | PG | 50% | TIMESLOT 17 9-1-07 | TIMESLOT 17 9-1-07 | 42 | ... |
| 722 | AD3 | FUNERAL | TALK | PG13 | SCH ONLY | TIMESLOT 73 9-8-07 | TIMESLOT 73 9-8-07 | 106 | ... |
| 724 | AD4 | THEMEPARK | MUSIC | G | 20% | NONE | NONE | 93 | ... |
| | ... | ... | ... | ... | ... | ... | ... | ... | |

*FIG. 7*

700 META DATA TABLE

FIG. 8

ON DEMAND DYNAMIC ADVERTISEMENT INSERTION IN AN INTERNET PROTOCOL STREAM

BACKGROUND OF THE INVENTION

1. Field of the Invention

The present invention relates to data processing systems, and in particular to Internet Protocol (IP) streaming technologies. More particularly, the present invention relates to an on demand dynamic advertisement insertion in an Internet Protocol stream.

2. Description of the Related Art

Advertising timeslots are traditionally purchased based on historic trends in broadcast viewership. Polls such as the Nielsen ratings attempt to inform media outlets and advertisers as to the worth of an advertising time slot. Nielsen Media Research headquarters are located in New York, N.Y. Sweeps is a period, typically a week, each fall, winter, and spring when television ratings are accrued, studied, and advertising rates are reset.

Television content delivery has undergone an evolution with the advent of the Internet Protocol based media presentation. Instead of passively receiving television and radio signals, the viewers may contact providers and request media, such as subscription television services, pay for view, and streaming video. Media providers may provide both multicast groups and unicast streams to the viewer, based on viewer requests. A multicast is the delivery of information to a group of destinations simultaneously. A unicast is the delivery of media in the form of information packets to a single destination. Internet Protocol streaming television content or an Internet Protocol streaming telecast, as used herein, is the image, sound, or content of a combined audio and video presentation, independent of the device in which the content is received. As such, an Internet Protocol streaming telecast may be viewed on a traditional television set, as well as a personal computer, telephone, PDA or any device in which combined audio and video may be received. An Internet Protocol streaming telecast may be received via a multicast or unicast signal.

Current television sets can receive an Internet Protocol streamed telecast by using a two-way digital broadcast signal. The signal may be sent through a switched telephone or cable network by way of a broadband connection and a set top box programmed with software that can handle viewer requests to access many available media sources. The viewer's television set may connect to a set top box that decodes the Internet Protocol video and converts it into standard television signals. The viewer can access different telecasts by using the television remote to send control commands to the switched video service. The unit processes the request and displays the requested media type.

SIP, the Session Initiation Protocol, is a signaling protocol for Internet conferencing, telephony, presence, events notification, and instant messaging. SIP is a text-based protocol, similar to HTTP and SMTP, for initiating interactive communication sessions between users. Such sessions include voice, video, chat, interactive games, and virtual reality. SIP was developed within the IETF MMUSIC (Multiparty Multimedia Session Control) working group.

SUMMARY OF THE INVENTION

The illustrative embodiments provide a computer implemented method, computer program product, and data processing system, for managing advertisements in an Internet Protocol (IP) streaming environment by defining a viewership threshold, monitoring the Internet Protocol streaming environment, and responsive to reaching the viewership threshold, programming alternate advertisements.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
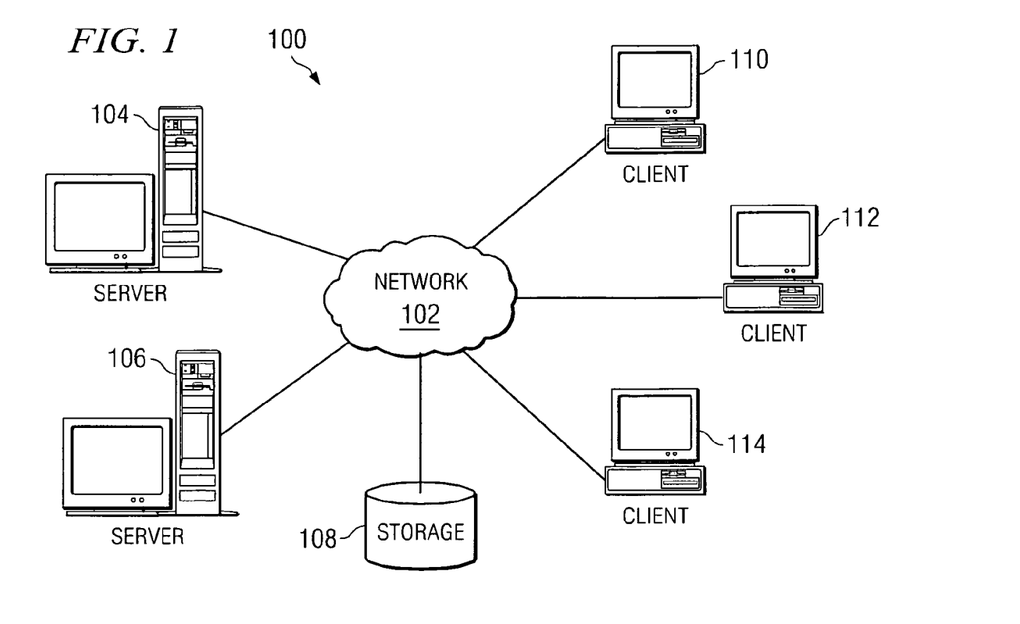
FIG. 1 depicts a network of data processing systems in which illustrative embodiments may be implemented.
Figure 2:
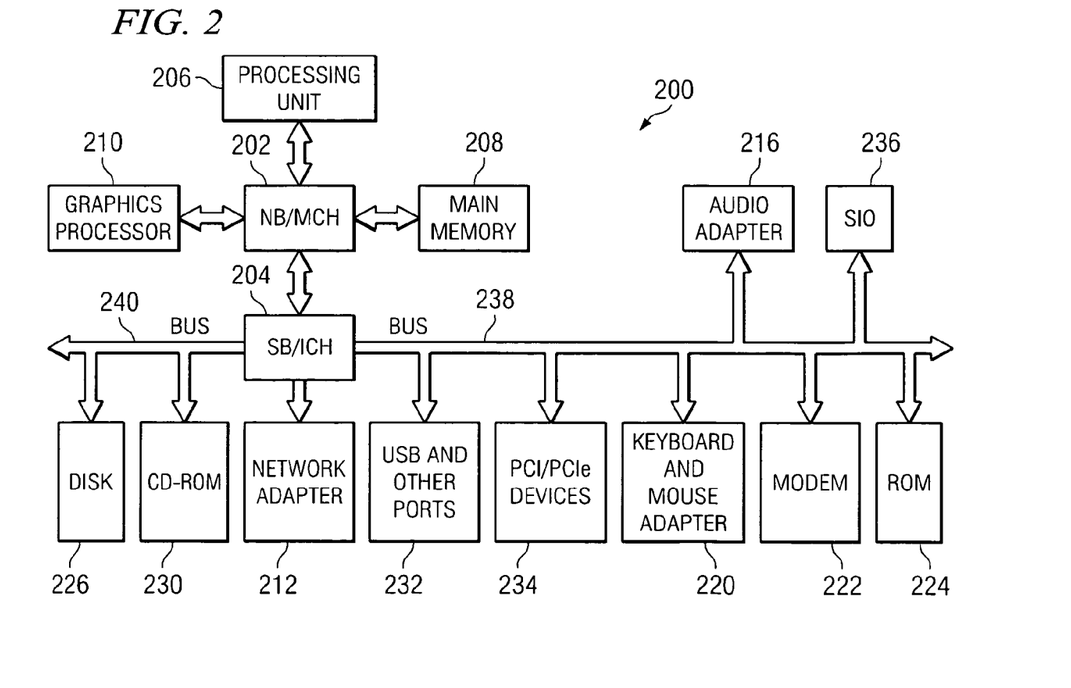
FIG. 2 shows a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. These servers could represent VoD, Middleware or Ad servers. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming language, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The Internet is a global network of computers and networks joined together by means of gateways that handle data transfer and the conversion of messages from a protocol of the sending network to a protocol used by the receiving network. On the Internet, any computer may communicate with any other computer with information traveling over the Internet through a variety of languages, also referred to as protocols. The set of protocols used on the Internet is called Transmission Control Protocol/Internet Protocol (TCP/IP). With respect to transferring data over the Internet, the World Wide Web environment is used. This environment is also referred to simply as "the Web". The Web is a mechanism used to access information over the Internet.

In the Web environment, servers and clients may effect data transactions using the hypertext transfer protocol (HTTP), a known protocol for handling the transfer of various data files, such as text files, graphic images, animation files, audio files, and video files. On the Web, the information in various data files is formatted for presentation to a user by a standard page description language, the hypertext markup language (HTML). Documents using HTML are also referred to as Web pages. Web pages are connected to each other through links or hyperlinks. These links allow for a connection or link to other Web resources identified by a universal resource identifier (URI), such as a uniform resource locator (URL).

An Application Programming Interface (API) is the interface that a computer system, library or application provides in order to allow requests for services to be made of it by other computer programs, and/or to allow data to be exchanged between them.

SIP, the Session Initiation Protocol, is a typical signaling protocol for Internet conferencing, telephony, presence, events notification, and instant messaging. Such sessions include voice, video, chat, interactive games, and virtual reality. As a text based, request/response protocol, SIP is similar to HTTP and SMTP, however SIP is peer to peer. SIP is a signaling protocol for creating, modifying, and destroying dialogs between multiple endpoints. SIP headers are similar to HTTP header fields in both syntax and semantics. The following request messages are defined by the core SIP protocol, INVITE, which invites a participant to a session, BYE, which ends a client's participation in a session, CANCEL, which terminates a transaction, ACK, which is acceptance, and REGISTER, which informs a SIP server about the location of a user and OPTIONS, which queries a participant about their media capabilities.

Figure 3:
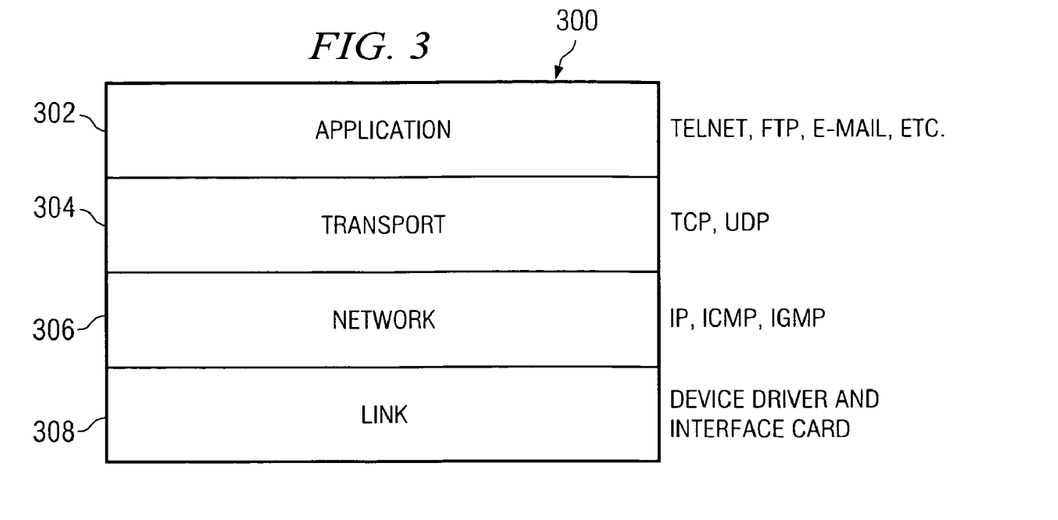
FIG. 3 is a diagram of a Transmission Control Protocol/Internet Protocol (TCP/IP) and similar protocols in accordance with the illustrative embodiments of the present invention.

FIG. 3 is a diagram of a Transmission Control Protocol/ Internet Protocol (TCP/IP) and similar protocols in accordance with the illustrative embodiments. TCP/IP and similar protocols are utilized by communications architecture 300. In this example, communications architecture 300 is a 4-layer system. This architecture includes application layer 302, transport layer 304, network layer 306, and link layer 308. Each layer is responsible for handling various communications tasks. Link layer 308 also is referred to as the data-link layer or the network interface layer and normally includes the device driver in the operating system and the corresponding network interface card in the computer. This layer handles all the hardware details of physically interfacing with the network media being used, such as optical cables or Ethernet cables.

Network layer 306 also is referred to as the internet layer and handles the movement of packets of data around the network. For example, network layer 306 handles the routing of various packets of data that are transferred over the network. Network layer 306 in the TCP/IP suite is comprised of several protocols, including Internet Protocol (IP), Internet Control Message Protocol (ICMP), and Internet Group Management Protocol (IGMP).

Next, transport layer 304 provides an interface between network layer 306 and application layer 302 that facilitates the transfer of data between two host computers. Transport layer 304 is concerned with things such as, for example, dividing the data passed to it from the application into appropriately sized chunks for the network layer below, acknowledging received packets, and setting timeouts to make certain the other end acknowledges packets that are sent. In the TCP/IP protocol suite, two distinctly different transport protocols are present, TCP and User Datagram Protocol (UDP). TCP provides reliability services to ensure that data is properly transmitted between two hosts, including dropout detection and retransmission services.

Conversely, UDP provides a much simpler service to the application layer by merely sending packets of data called datagrams from one host to the other, without providing any mechanism for guaranteeing that the data is properly transferred. When using UDP, the application layer must perform the reliability functionality.

Application layer 302 handles the details of the particular application. Many common TCP/IP applications are present for almost every implementation, including a Telnet for remote login; a file transfer protocol (FTP); a simple mail transfer protocol (SMTP) for electronic mail; and a simple network management protocol (SNMP).

Figure 4:
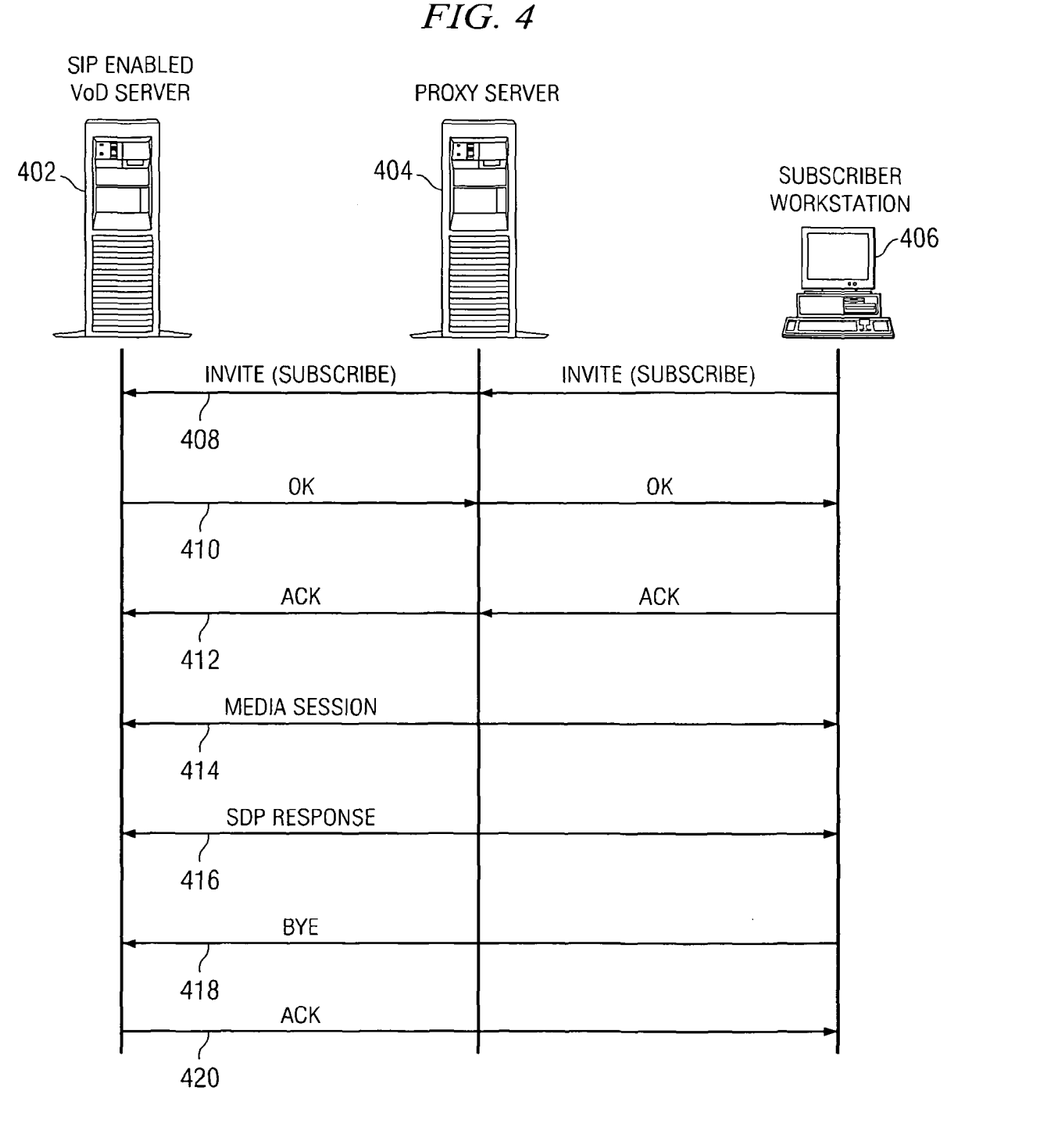
FIG. 4 is a diagram indicating the steps in establishing a SIP based subscription in accordance with the illustrative embodiments.

FIG. 4 is a diagram indicating the steps in establishing a SIP based subscription in accordance with the illustrative embodiments. The SIP interface operates at level 4 of the Internet Protocol Stack in the application layer, such as application layer 302 of FIG. 3. Therefore, this invention is primarily a level 4 application, using the network services at the lower levels for delivery. A subscription is an agreement to receive or be given access to electronic services.

SIP enabled video-on-demand (VoD) server 402, such as server 200 of FIG. 2, is indicated in the left portion of the figure. Proxy server 404, another example of a server such as server 200 of FIG. 2, is indicated in the center of the figure and subscriber workstation 406 is indicated in the right portion of the figure. Workstation 406 is an example of client 106 of FIG. 1. Steps 408-420 to establish a SIP based subscription are indicated by the arrows. Subscriber workstation 406 initiates the call to the Video on Demand server (step 408). This request is captured by proxy server 404. Video on Demand server 402 sends the corresponding Session Description Protocol (SDP) information (step 410). Session Description Protocol is a format for describing streaming media initialization parameters. Session Description Protocol is intended for describing multimedia sessions for the purposes of session announcement, session invitation, and other forms of multimedia session initiation. Step 410 is also captured by proxy server 404.

Figure 5:
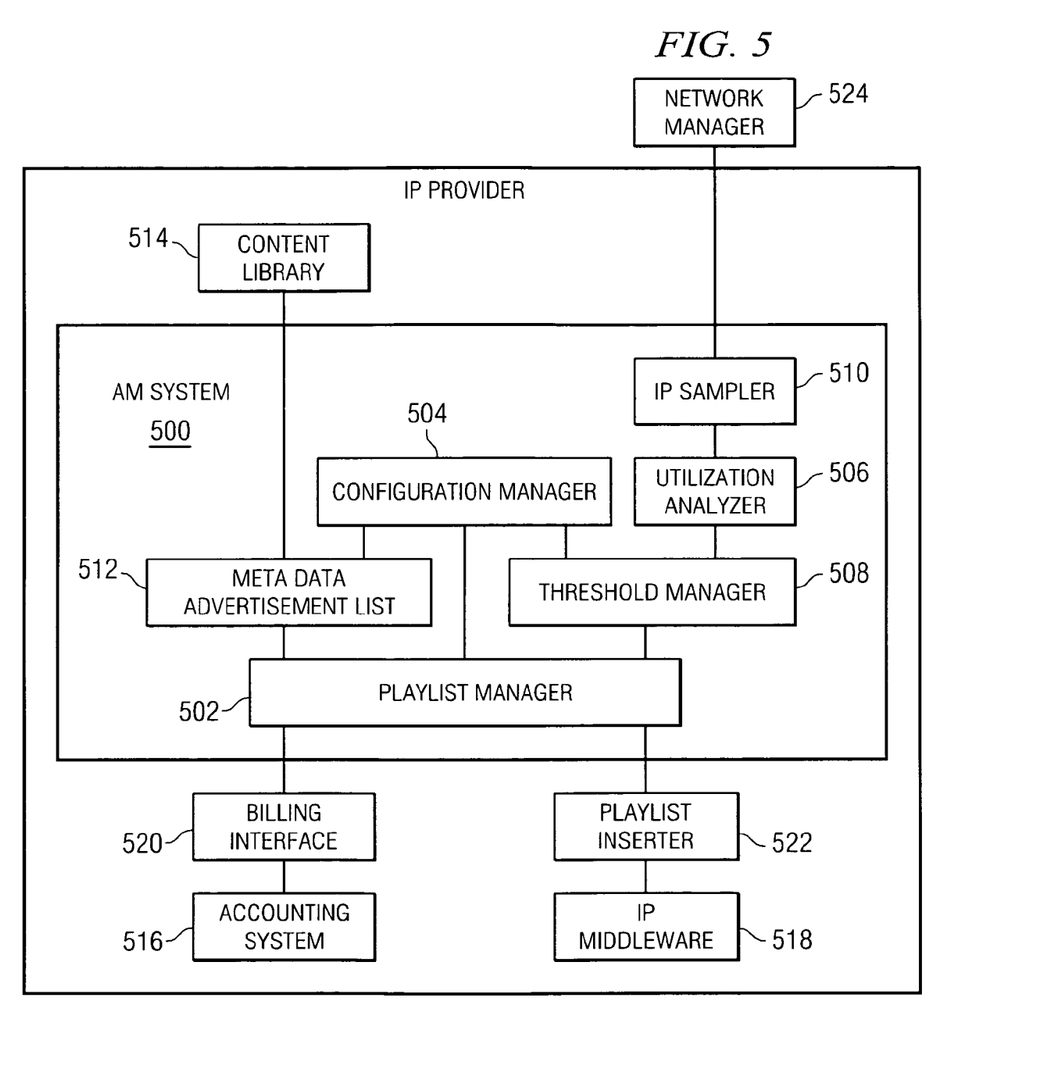
FIG. 5 is a block diagram depicting modules and interfaces of the advertising management system in accordance with the illustrative embodiments.

Through proxy server 404, the Internet Protocol sampler such as Internet Protocol sampler 510 illustrated in FIG. 5, has access to the Session Description Protocol record. Contained within the Session Description Protocol record is connection information that may be used to identify the subscription and session time information that may identify when the session started and when the session terminated. Subscriber workstation 406 sends an acknowledgment back through proxy server 404 to Video on Demand (VoD) server 402 (step 412). The media session, Session Description Protocol response, as well as the bye and the bye acknowledgement are as shown in steps 414-420.

The illustrative embodiments provide an Advertisement Management system (hereinafter AM system) in an Internet Protocol streaming environment that allows for automatically updating advertising programming based upon viewer utilization data. An Internet Protocol streaming environment is an environment in which an IP provider streams audio, video, or audio and video to a user. The illustrative embodiments may be implemented on an Internet Protocol network, such as network 102 in FIG. 1. An advertisement as used herein is a paid announcement or a public notice inserted into the Internet Protocol streaming environment. The AM system may require access to the real time or near real time network statistics captured by the Internet Protocol middleware software or the Operational Support System software that connects to the network management system. The TCP/IP package header may provide information relating to the consumer and the content selected. The information may also be provided through an Internet Protocol service provider system of "click awareness." Click awareness is a method of determining and recording user selections.

Consider an example case of Internet Protocol service provider Alpha. Alpha provides streaming video telecasts to customers using several routes of delivery. A telecast, as used herein, is audio and/or video content streamed over an Internet Protocol environment. The routes include multicast video via a set top box or web cast technologies, and unicast services such as video-on-demand (VoD). Video on Demand may also be a multicast delivery. Viewers using Alpha's services may watch the streaming video telecast live or record the streaming video telecast to watch later. Alpha provides a variety of streaming video content. In this example, a single streaming video "channel 1" will be used to illustrate the embodiments. If the same content is telecast over several channels, those several channels may be treated as one channel for the purposes of these illustrative embodiments. Those of ordinary skill in the art will appreciate that an Internet Protocol service provider may choose to manage all advertising content by implementing the illustrative embodiments.

Advertiser A is willing to pay premium rates for an advertising timeslot on channel 1, but only if channel 1 has enough viewers. Advertiser B will only pay the lower rate for advertising on channel 1. In this example, the AM system will manage Alpha's advertising content by running Advertiser A commercials during high volume times and Advertiser B commercials during standard or low volume times. The AM system may also mix the Advertisers' ads in a single play list.

Alpha, using a configuration subsystem provided by the AM system, sets a utilization threshold to be used by the system. In this case, the threshold is defined as a utilization threshold. However, in other examples, the threshold may be defined in a wide variety of ways, such as the number of days with a high temperature over eighty degrees, so that a sunscreen advertisement may be inserted. Those of ordinary skill in the art may appreciate that such parameters may be candidates for use as a threshold. In this case, the utilization threshold is the criterion that determines a change in advertising content. Additionally in this example, utilization is the number of all viewers accessing the streaming video telecast. The utilization threshold may be configured differently for each channel and/or each timeslot. In this case, exceeding the utilization threshold triggers a change in the advertisement playlist as well as the advertising rates. The utilization threshold may be configured by the user. In another illustrative embodiment, the utilization threshold may be defined as the number of viewers that meet a particular profile, such as the number of viewers in an adult only household or the number of Spanish speaking viewers.

Advertiser A sends streaming video ads A1, A2, and A3, and Advertiser B sends streaming video ads B1, B2, and B3 to Alpha. Alpha stores the ad content and information about the ads, called meta data, in a content library database associated with the Internet Protocol provider content management system. The AM system accesses the Internet Protocol provider content library and creates an advertisement meta data list. The user may configure which data is collected and stored in the advertisement meta data list.

The AM system contains a playlist manager. Play lists are the sequences of ads that are played together. The playlist manager checks to see if the current channel utilization exceeds the threshold utilization defined for the particular timeslot. If the playlist manager determines that the threshold utilization has not been exceeded, then the scheduled playlist will be passed to the playlist inserter subsystem. The playlist may be a list of pointers that indicate the advertisements to be played and the location of the advertisements contained in the meta data library.

In this example, the play list manager creates a "playlist A" consisting of A1, A2, and A3, and a "playlist B" consisting of B1, B2, and B3. The playlist manager schedules playlist B for the channel 1 timeslot. In this example, a lower than threshold channel utilization is expected and therefore "playlist B" is the default or scheduled playlist.

Prior to the scheduled time, the AM system samples the Internet Protocol stream to determine the utilization of channel 1. If the utilization threshold is not exceeded, indicating that viewership is low, "playlist B" is played as scheduled. However if the utilization threshold is exceeded, the AM system inserts "playlist A" instead of "playlist B." The AM system detects the advertisement interrupt, records the billing rate and advertiser, and passes this information to the Internet Protocol provider's accounting system. Once determined the playlist is passed to an advertisement playing module within the Internet Protocol provider to be played.

FIG. 5 is a block diagram depicting modules and interfaces of the advertising management system in accordance with the illustrative embodiments. The advertising management system may be located in a server, such as server 200, of FIG. 2. Internal interfaces for this system may be an XML (Extensible Markup Language) based style of interface. The AM system 500 is a system that is contained within the Internet Protocol provider systems. AM system 500 has the following modules: playlist manager 502, configuration manager 504, utilization analyzer 506, threshold manager 508, Internet Protocol sampler 510, and meta data advertisement list 512. AM system 500 interconnects to Internet Protocol provider subsystems such as content library 514, accounting system 516, and Internet Protocol middleware 518. Billing interface 520 is the interface between playlist manager 502 and accounting system 516 to enable access to accounting information. Playlist inserter 522 is the interface between playlist manager 502 and Internet Protocol middleware 518 to enable playlist insertion into an Internet Protocol stream segment.

The Internet Protocol provider interfaces to network manager 524. Internet Protocol sampler 510 gathers the information through the Internet Protocol provider interface to the network manager 524 to enable sampling of the multicast datagrams that are sent. A datagram is an independent, self-contained message sent over a network.

Utilization analyzer 506 calculates both the baseline utilizations for each channel and the current utilization for each channel. Utilization analyzer 506 takes the SIP header invite and termination information and translates these into utilization statistics per channel. The illustrative embodiments may reside in a network that is SIP enabled to generate the SIP call information. A SIP call establishes sessions for features such as audio/videoconferencing, interactive gaming, and call forwarding to be deployed over Internet Protocol networks.

Utilization analyzer 506 operates over a database that stores analytic data used at the time the utilization per channel is calculated. The illustrative embodiments provide for a scalable (either horizontal or vertical) processor, such as processing unit 206 of FIG. 2, to manage the in memory functions of utilization analyzer 506 and the coupling to Internet Protocol Sampler 510. The SIP interface operates at level 4 of the Internet Protocol Stack in the application layer, such as application layer 302 of FIG. 3, therefore this invention is primarily a level 4 application, using the network services at the lower levels only for delivery.

Threshold manager 508 determines whether a utilization threshold has been exceeded. Threshold manager 508 receives input from the user through configuration manager 504. In another embodiment, a threshold may not be associated with a utilization threshold, but may be associated with an alert such as a weather emergency. The user may configure AM system 500 to insert an advertisement concerning storm shelters or weather band radios. In this example, however threshold manager 508 receives current utilization information from utilization analyzer 506. Threshold manager 508 compares the current utilization information with the threshold utilization as input through configuration manager 504. Threshold manager 508 changes the advertising playlist based on whether the utilization threshold is exceeded.

Internet Protocol sampler 510 accesses network manager 524 to obtain viewer utilization data. Internet Protocol sampler 510 passes the information to utilization analyzer 506. Meta data advertisement list 512 interconnects with Internet Protocol provider content library 514 to get meta data for the advertisements. Meta data advertisement list 512 is an advertisement meta data store of all of the advertisements that will be scheduled to play, whether in a scheduled playlist or a dynamic playlist. Content library 514 may also be contained in a relational database as well as a file system to store raw advertisement streams.

Configuration manager 504 supplies and manages the data and algorithms that are user configurable in the AM system modules. Configuration manger 504 may implement graphical user interfaces (GUIs) for user data input into meta data advertisement list 512, playlist manager 502 and threshold manager 508. In the initial setup process for the AM system, the user, in order to create the advertisement selection criteria enters configuration data. Selection may be time based, for example, an advertisement may play only twice in a one hour period. Alternatively, selections may be demand based, for example, the advertisement will play when viewership is greater than 20% of total possible subscribers. In other words, when the current utilization of a channel exceeds a 20% threshold utilization.

Playlist manager 502 works with content library 514 to identify playlist items that are scheduled. Playlist manager 502 makes the determination whether or not to override the scheduled playlist with a dynamic intelligent playlist. Playlist manager 502 makes this decision using the utilization by channel information from utilization analyzer 506.

If the threshold utilization is exceeded, the playlist manager may pass a preselected dynamic intelligent playlist from the content library 514 to Playlist inserter 522. Alternatively, playlist manager 502 may use information from metadata advertisement list 512 to create a dynamic intelligent play list. A dynamic intelligent playlist is a playlist that overrides the playlist scheduled for a particular timeslot. In the case of Internet Protocol provider Alpha, "playlist A" is a dynamic intelligent playlist that overrides "playlist B," the scheduled playlist. If the current utilization does not exceed the threshold utilization, playlist manager 502 passes the scheduled playlist to playlist inserter 522.

Playlist manger 502 may create a dynamic intelligent playlist at any time. For instance, a dynamic intelligent playlist may be created by the playlist manager months, days or just before the playlist is inserted into the Internet Protocol stream telecast. Once playlist manager 502 has selected the playlist, whether scheduled or dynamic, playlist manager 502 passes the playlist to playlist inserter 522. Playlist inserter 522 interfaces with Internet Protocol middleware 518 to enable the playlist to be inserted into the Internet Protocol streaming telecast. The actual advertising playlist insertion into the Internet Protocol streaming telecast is done from within Internet Protocol provider Internet Protocol middleware 518. In addition, playlist manager 502 sends information to billing interface 520 so that the advertiser may be billed at the correct billing rate for the advertisements that are inserted. Billing interface 520 interfaces to the Internet Protocol provider's accounting system 516. Billing interface 520 is a backend interface for billing and rating. Billing interface 520 provides access into systems such as a general ledger system for capture of accounting information.

Figure 6:
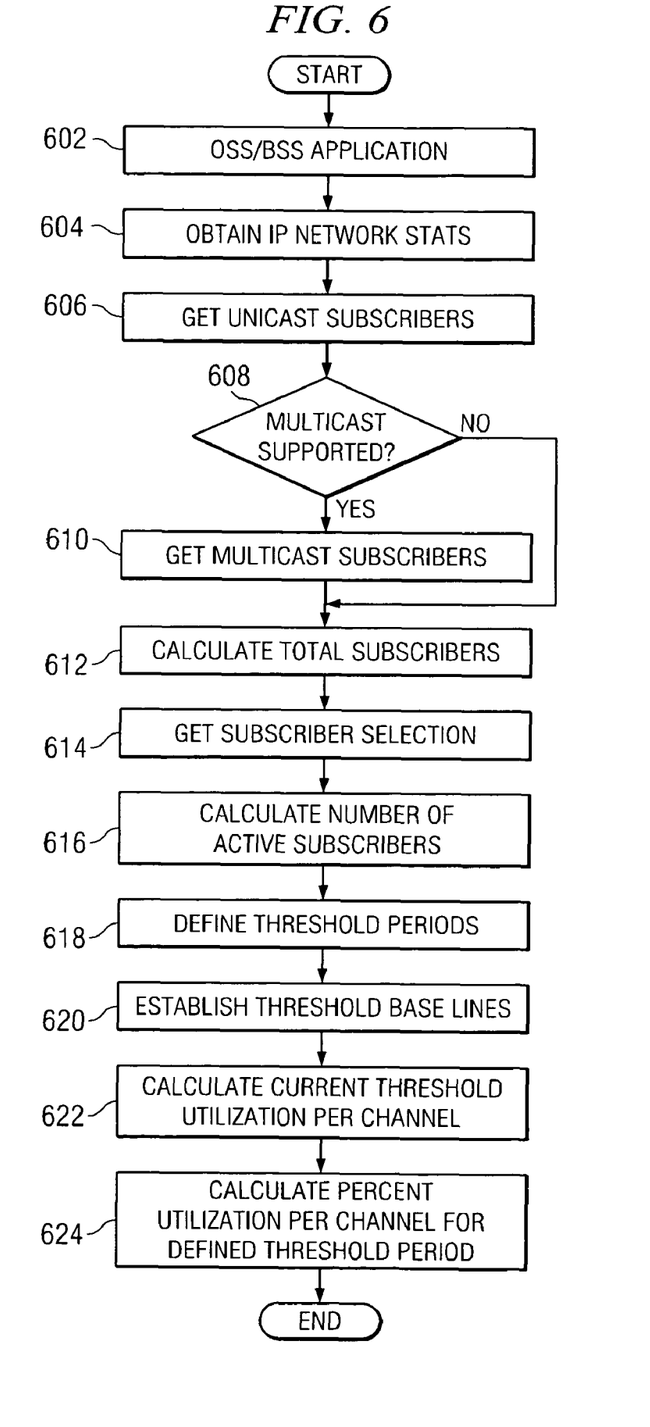
FIG. 6 is a flow chart illustrating the processes of the utilization analyzer of the advertisement management system in accordance with the illustrative embodiments.

FIG. 6 is a flow chart illustrating the processes of the utilization analyzer of the advertisement management system in accordance with the illustrative embodiments. The utilization analyzer, such as utilization analyzer 506 of AM system 500 in FIG. 5, is the module in the AM system that accesses the real time or near real time network statistics captured by the Operational Support System software or the Internet Protocol middleware software that connects to the network management system (steps 602 and 604). The utilization analyzer determines the number of Unicast subscribers (step 606). If multicast is supported (a yes output to step 608), the utilization analyzer determines the number of multicast subscribers (step 610). The utilization analyzer then calculates and stores the total number of subscribers (step 612). Returning to step 608, if multicast is not supported, the process calculates total subscribers (steps 612). When calculating the total number of users, the number of interactive and prerecorded users may be identified. This may require access into the client provisioning or billing systems. Utilization totals may be updated real time or semi real time.

A Quality of Service (QoS) measure may be used to determine the numbers of users that are actually active. The Internet Protocol sampler, such as Internet Protocol sampler 510 of FIG. 5, may use a form of "Click awareness" for the users' channel selection. Viewers may also store preferences for the types of programming that they view. This data may provide another dimension to the selection algorithm used in the playlist manager, such as playlist manager 502 in FIG. 5, for the selection of advertisements. The Quality of Service software may be used to determine the user actions and provide the data back to user profiles. This data may be accessed by the configuration module to provide further algorithms to more accurately target playlist selections.

The utilization analyzer determines the baseline utilization for each channel by obtaining the subscribers channel selection (step 614) and calculating the percentage of active subscribers for a channel (step 616). The next step is to define threshold periods (step 618). The utilization analyzer obtains historic statistics from the network to determine usage and utilization when making decisions on the creation of the periods. Defining threshold periods may be done by the user, using the configuration module, or the definitions may be created by an algorithm that automatically segments the day.

The utilization analyzer then establishes the baseline utilization numbers by channel for each defined threshold period (step 620). Once a baseline of service has been established, the data will be stored in a baseline database. This baseline may be used to compare utilization once the setup is complete and the AM system is in operation. Baseline data includes but is not limited to: channel utilization, availability, pricing per segment, and rating profile. The baseline may be revisited periodically to be updated or refined based on a new channel introduction or changes to the Internet Protocol provider's business model.

The utilization analyzer uses the same methodology to calculate the current utilization by channel, when an interrupt signal is received by the AM system signaling the utilization analyzer (step 622). The utilization analyzer calculates and then stores the percent utilization per channel for a defined threshold period (step 624), thus ending the process.

Figure 7:
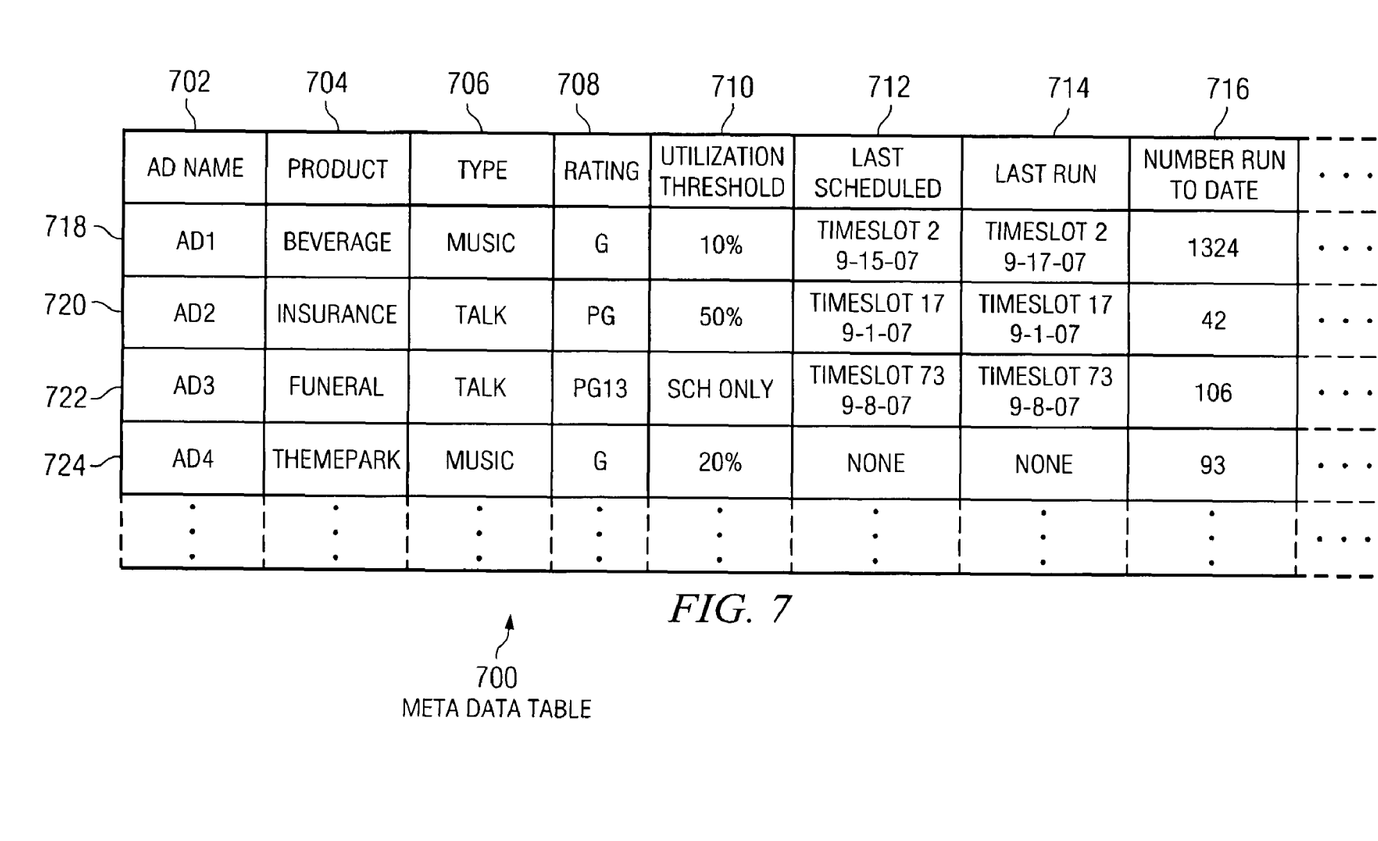
FIG. 7 is a table picturing a sample of the advertisement data that may be found in a meta data advertisement list of the advertisement management system in accordance with the illustrative embodiments.

FIG. 7 is a table picturing a sample of the advertisement data that may be found in a meta data advertisement list of the advertisement management system in accordance with the illustrative embodiments. The meta data advertisement list may not capture the content of the individual advertisements, rather the meta data advertisement list may assume a preexisting schema generated with tagged values that identify the relationship between the content meta data and the actual advertising content. The preexisting schema may be the native schema of the Internet Protocol provider.

The meta data table 700 contains the name of the advertisement 702, product being advertised 704, type of advertisement 706, rating of the advertisement 708, utilization threshold 710, time and date of the last scheduled run of the advertisement 712, time and date of the last actual run of the advertisement 714, and number of times the advertisement has been run to date 716. Those of ordinary skill in the art will appreciate that many more types of meta data may be stored in the meta data table in accordance with the illustrative embodiments.

First record 718 lists advertisement AD1. AD1 is a musical advertisement for a beverage with a rating for general audiences. AD1 has a utilization threshold of 10%. AD1 may be a scheduled advertisement, it was last scheduled to run during timeslot 2 on September $15^{th}$. However, AD1 may also be a dynamic advertisement. If a channel achieves a utilization exceeding 10% of the subscribing viewership, AD1 may be added to a dynamic intelligent playlist and inserted into the Internet Protocol stream telecast. AD1 was last run during timeslot 2 on September $17^{th}$. AD1 has run one thousand three hundred twenty-four times. The meta data advertisement list may be configured to break out the number of times an advertisement has run by whether the advertisement was in a scheduled or dynamic intelligent playlist.

Second record 720 list meta data for advertisement AD2, an insurance advertisement. The utilization threshold is set higher than AD1 at 50% of the subscribing audience. Both the last scheduled and the last run date times are timeslot 17, September $1^{st}$, indicating that the AD2 has not been run since it was last scheduled. Those of ordinary skill in the art can appreciate that each advertisement may have a different utilization threshold per channel.

Third record 722 is for AD3 which is an advertisement that only runs during scheduled times. Fourth record 724 AD4 is a musical advertisement that is not scheduled, but runs only when the channel utilization exceeds 20% of the subscription audience. Many more meta data types may be added to meta data table 700.

Figure 8:
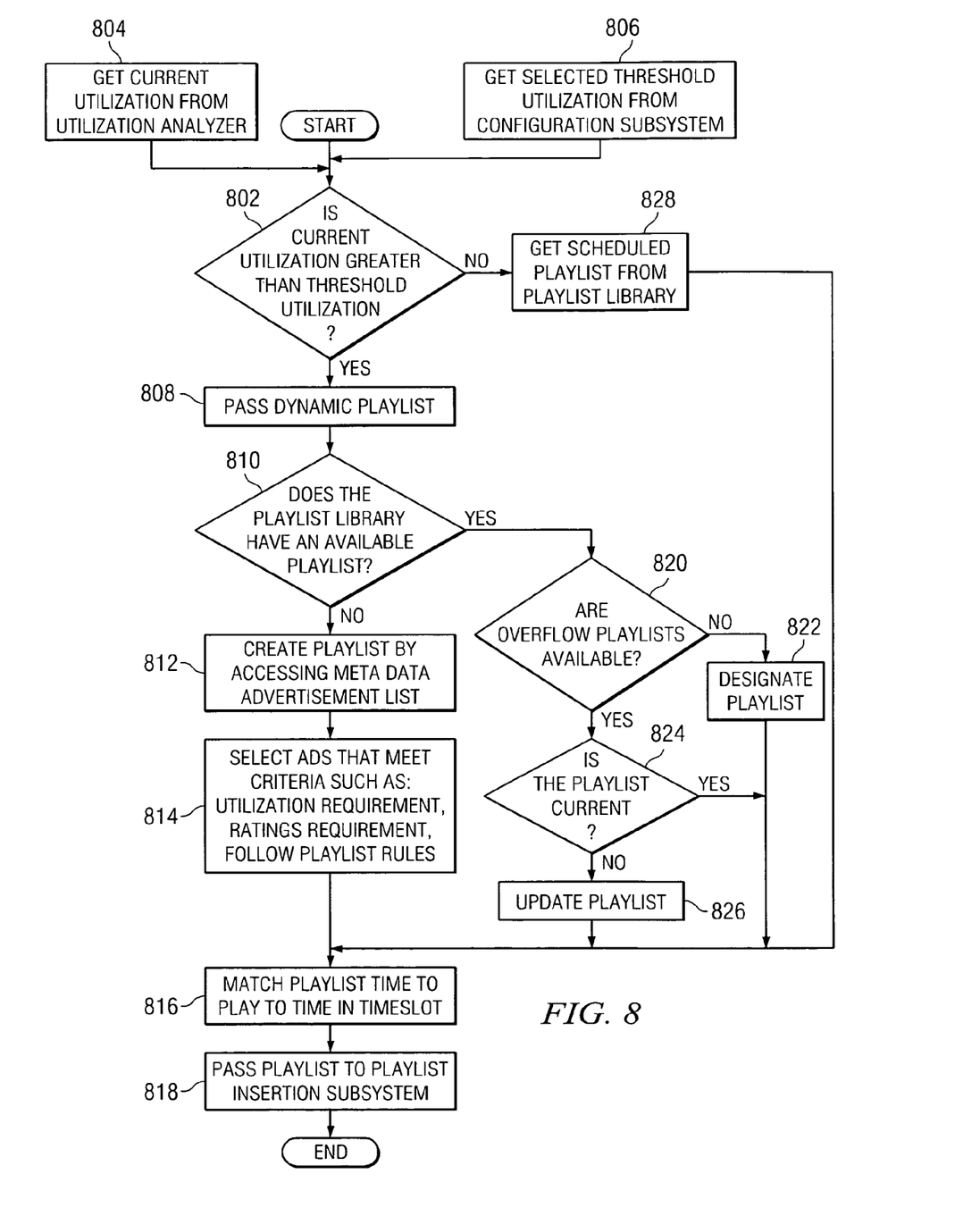
FIG. 8 is a flow chart that depicts the steps implemented in the playlist manager module of the advertisement management system in accordance with the illustrative embodiments.

FIG. 8 is a flow chart that depicts the steps implemented in the playlist manager module of the advertisement management system in accordance with the illustrative embodiments. The playlist manager is an example of playlist manager 502 of FIG. 5. The process begins with the playlist manager determining whether the current utilization of a channel exceeds a threshold utilization of a channel (step 802). The determination is made by obtaining the current utilization by channel from the utilization analyzer (step 804), such as utilization analyzer 506 in FIG. 5, and obtaining the user selected threshold number (step 806). The playlist manager will determine the items that can be played in the timeframe and relative priority of the advertisements that are to be input into the segment. The playlist manager will take into account the rules regarding play and replay. These rules will be stored in a metadata library.

If there are additional advertisements that can be played within the timeslot and according to the play rules, these will be added to the playlist. If there are no additional advertisements meeting the demand criteria, programmed content will be retrieved and played during the scheduled advertisement segment.

If the current utilization does exceed the threshold utilization (a 'yes' output to step 802), the playlist manager will pass a dynamic intelligent playlist to the Internet Protocol inserter (step 808). First, the playlist manager will determine if a playlist library, a database within the playlist manager, has an available playlist (step 810). If there are no available playlists in the playlist library (a 'no' output to step 810), the playlist manager will create the playlist by accessing the meta data advertisement list (step 812). The playlist manager then selects the appropriate advertisement based on the meta data of the advertisement (step 814). The Internet Protocol inserter interface confirms that the playlist time to play is compatible with the amount of time in the timeslot (step 816). The playlist manager then passes the playlist to the playlist insertion subsystem (step 818), with the process terminating thereafter.

Returning now to step 810, if there is an available playlist in the playlist library (a 'yes' output to step 810), the playlist manager will determine if there are any overflow playlists available before selecting a non-overflow playlist (step 820). An overflow playlist contains at least one overflow advertisement. An overflow advertisement is one that had been queued to be played previously, but was not played. If there are no overflow playlists available (a 'no' output to step 820), the playlist manager will designate a non-overflow playlist from the playlist library (step 822). The Internet Protocol inserter interface confirms that the playlist time to play is compatible with the amount of time in the timeslot (step 816). The playlist manager then passes the playlist to the playlist insertion subsystem (step 818), with the process terminating thereafter.

Returning now to step 820, if there is an overflow playlist available (a 'yes' output to step 820), the playlist manager will the make the determination whether the playlist is current (step 824). If the playlist is current (a yes output to step 824) the playlist is passed to the Internet Protocol inserter, which confirms that the playlist time to play is compatible with the amount of time in the timeslot (step 816). The playlist manager then passes the playlist to the playlist insertion subsystem (step 818), with the process terminating thereafter. Returning to step 824 if the playlist is not current (a no output to step 824) the playlist is updated (step 826) before it is passed to the Internet Protocol inserter, which confirms that the playlist time to play is compatible with the amount of time in the timeslot (step 816). The playlist manager then passes the playlist to the playlist insertion subsystem (step 818), with the process terminating thereafter.

Returning to step 802, if the threshold utilization is not exceeded (a 'no' output to step 802), the playlist manager gets the-scheduled playlist (step 828) from the playlist library, which may be stored within the playlist manager module. The Internet Protocol inserter interface confirms that the playlist time to play is compatible with the amount of time in the timeslot (step 816). The playlist manager then passes the playlist to the playlist insertion subsystem (step 818), with the process terminating thereafter.

Figure 9:
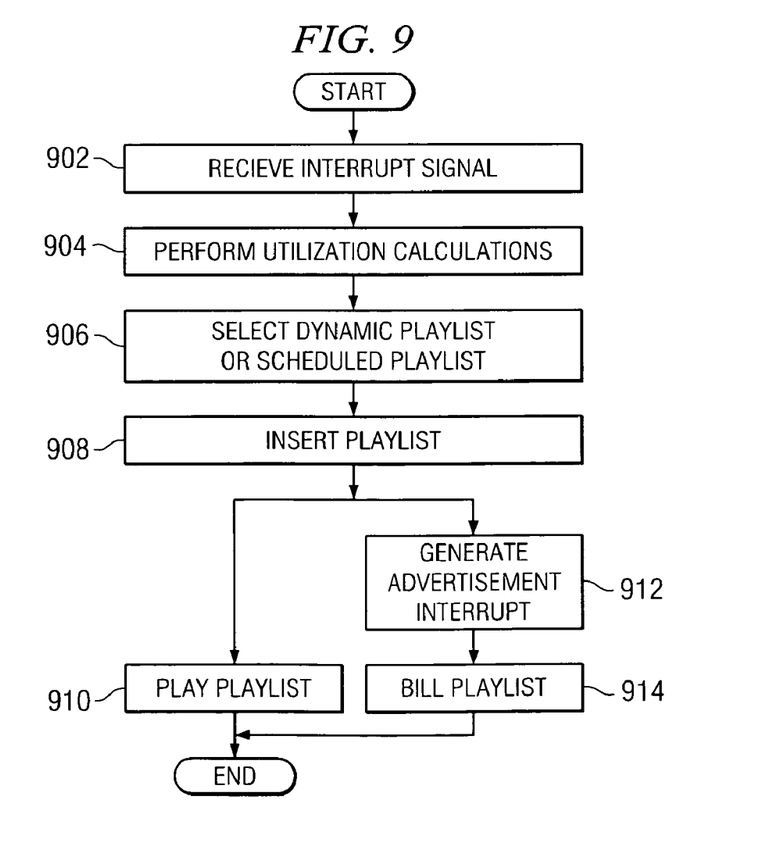
FIG. 9 shows a flow chart of the top-level operations of the advertisement management system in accordance with the illustrative embodiments.

FIG. 9 shows a flow chart of the top-level operations of the advertisement management system in accordance with the illustrative embodiments. The process begins with the AM system receiving an interrupt signal from the broadcast stream indicating that there will be a break in the stream (step 902). In the AM system, the Internet Protocol provider may configure the system to allow sampling to take place at a given interval prior to playing. The system would assume some latency to build the playlist and to prepare it for playing. The system will also allow the total switching off of on-demand insertion. This may be required for non peak periods of demand, or programming preferences.

The utilization module performs the current utilization calculations (step 904). The playlist manager then selects the playlist (step 906) and passes the playlist to the Internet Protocol inserter (step 908). The play list may be a virtual memory heap that will be retrieved at runtime to run the advertisements within a timeslot. The playlist may contain both on-demand inserted and program inserted advertisements. Simplistically, the playlist may be a large array of content pointers that is edited during the insertion process.

The Internet Protocol inserter, such as playlist inserter 522 in FIG. 5, interfaces with Internet Protocol middleware which actually plays the playlist (step 910), with the process terminating thereafter. When the Internet Protocol inserter passes the playlist at step 908, the Internet Protocol inserter generates an advertisement interrupt (step 912) which signals the billing interface, such as billing interface 520 in FIG. 5, to generate the Advertiser billing data to pass to the accounting module (step 914), with the process terminating thereafter.

The illustrative embodiments enable an organization to monitor Internet Protocol traffic and to insert advertising based on thresholds that would be configured at definition time. The illustrative embodiments may be entirely passive to the consumer, as they only sample the telecommunications network. Statistics are collected and analyzed in near real time removing the need for the consumer to actively participate in surveys. The illustrative embodiments use analysis of SIP Header Invite for a Multicast Group utilization and Unicast Stream subscription to determine the usage thresholds that are being achieved by a particular channel. This information may be obtained from the SIP Invite using a modified subject line as input. The negotiation of this information is the responsibility of the network manager and is performed by the Internet Protocol Sampler, or in another embodiment, a form of packet sniffer. A sniffer is a program and/or device that monitors data traveling over a network. The network manager provides input to the advertisement management system. An Internet Protocol Sampler may be required to pass SIP Header Invite and Bye or Close messages. This may allow for the creation of a pair record for a subscription.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing advertisements in an Internet Protocol streaming environment, the method comprising:
    defining a utilization threshold related to a number of viewers of an Internet Protocol streaming telecast in a Session Initiation Protocol (SIP) enabled network;
    monitoring, by a network sniffer, the Internet Protocol streaming environment for the Internet Protocol streaming telecast to determine if the utilization threshold has been exceeded, wherein the network sniffer detects and passes SIP header calls to a utilization analyzer;
    determining, by the utilization analyzer, statistics from the SIP header invite and termination information; and
    responsive to the statistics exceeding the utilization threshold, playing a dynamic intelligent playlist of advertisements during the Internet Protocol streaming telecast such that a different playlist of advertisements is played during the Internet Protocol streaming telecast depending upon whether or not the utilization threshold has been exceeded.

2. The computer implemented method of claim 1, wherein the utilization threshold is a percentage of active subscribers viewing an Internet Protocol streaming telecast.

3. The computer implemented method of claim 1, wherein the utilization threshold is a number of viewers viewing an Internet Protocol streaming telecast.

4. The computer implemented method of claim 1, wherein the utilization threshold is a number of viewers possessing like qualities.

5. The computer implemented method of claim 1, further comprising:
    responsive to not exceeding the utilization threshold, playing a scheduled playlist of advertisements during the Internet Protocol streaming telecast.

6. The computer implemented method of claim 1, further comprising:
    responsive to exceeding the utilization threshold, playing a mixture of scheduled and dynamic intelligent playlists of advertisements during the Internet Protocol streaming telecast.

7. The computer implemented method of claim 1, further comprising:
    playing a mixture of scheduled and dynamic advertisements within the dynamic intelligent playlist.

8. The computer implemented method of claim 1, wherein the monitoring step is implemented by detection of a SIP header and is used to determine a subscription of a user for video-on-demand or subscription programming.

9. The computer implemented method of claim 1, wherein the playing step is implemented by an Application Program Interface (API) transmitting to a playlist inserter of an Internet Protocol middleware on an application server.

10. A computer program product comprising:
a non-transitory computer readable storage medium including computer executable program code for managing advertisements in an Internet Protocol streaming environment, the computer program product including:
computer executable program code for defining a utilization threshold related to a number of viewers of an Internet Protocol streaming telecast in a Session Initiation Protocol (SIP) network;
computer executable program code for monitoring, by a network sniffer, the Internet Protocol streaming environment for the Internet Protocol streaming telecast to determine if the utilization threshold has been exceeded, wherein the network sniffer detects and passes SIP header calls to a utilization analyzer;
computer executable program code for determining, by the utilization analyzer, statistics from the SIP header invite and termination information; and
computer executable program code for playing a dynamic intelligent playlist of advertisements during the Internet Protocol streaming telecast responsive to the statistics exceeding the utilization threshold, such that a different playlist of advertisements is played during the Internet Protocol streaming telecast depending upon whether or not the utilization threshold has been exceeded.

11. The computer program product of claim 10, further comprising computer executable program code, wherein the utilization threshold is a percentage of active subscribers viewing an Internet Protocol streaming telecast.

12. The computer program product of claim 10, further comprising computer executable program code, wherein the utilization threshold is a number of viewers viewing an Internet Protocol streaming telecast.

13. The computer program product of claim 10, further comprising computer executable program code, wherein the utilization threshold is a number of viewers possessing like qualities.

14. The computer program product of claim 10, further comprising computer executable program code for playing mixed scheduled and dynamic advertisements, responsive to exceeding the utilization threshold.

15. A data processing system comprising:
a bus system;
a communications system connected to the bus system;
a memory connected to the bus system, wherein the memory includes a set of instructions; and
a processing unit connected to the bus system, wherein the processing unit executes the set of instructions to define a utilization threshold related to a number of viewers of an Internet Protocol streaming telecast in a Session Initiation Protocol (SIP) enabled network, monitor, by a network sniffer, an Internet Protocol streaming environment for the Internet Protocol streaming telecast to determine if the utilization threshold has been exceeded, wherein the network sniffer detects and passes SIP header calls to a utilization analyzer; determine, by the utilization analyzer, statistics from the SIP header invite and termination information, and play a dynamic intelligent playlist of advertisements during the Internet Protocol streaming telecast responsive to the statistics exceeding the utilization threshold, such that a different playlist of advertisements is played during the Internet Protocol streaming telecast depending upon whether or not the utilization threshold has been exceeded.

16. The data processing system of claim 15, further comprising:
the set of instructions to play a mixture of scheduled and dynamic intelligent playlists of advertisements responsive to exceeding the utilization threshold.

17. The data processing system of claim 15, further comprising:
the set of instructions to play a mixture of scheduled and dynamic advertisements within the dynamic intelligent playlist.

18. The data processing system of claim 15, wherein the set of instructions to play an advertisement is implemented by an Application Program Interface (API) transmitting to a playlist inserter of an Internet Protocol middleware on an application server.

* * * * *